No. 851,887. PATENTED APR. 30, 1907.
T. J. INGOLD.
TANK HEATER.
APPLICATION FILED FEB. 5, 1907.
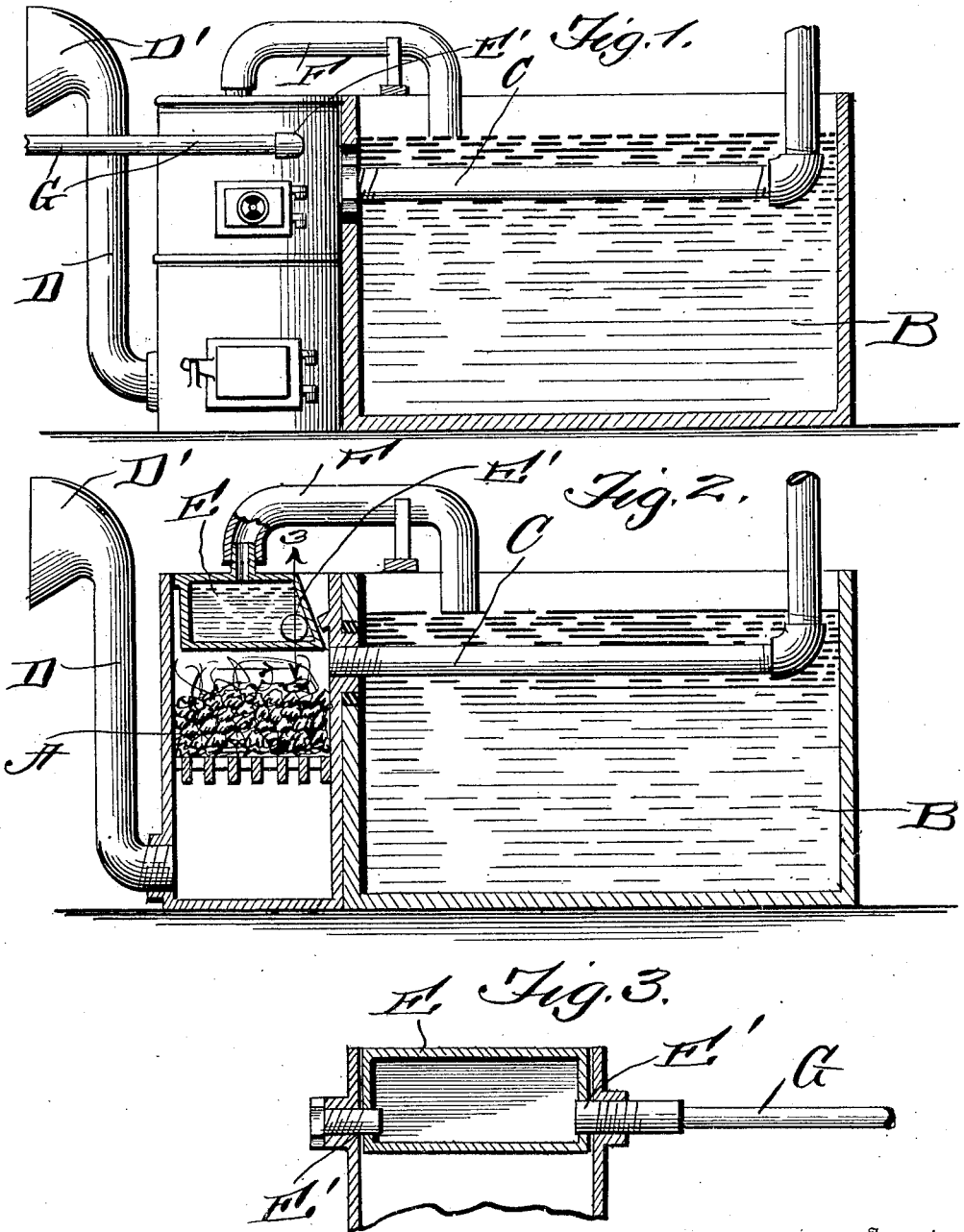
Inventor
Theodore J. Ingold,
By Franklin N. Hough
Attorney
Witnesses

UNITED STATES PATENT OFFICE.

THEODORE J. INGOLD, OF FARMINGTON, ILLINOIS.

TANK-HEATER.

No. 851,887. Specification of Letters Patent. Patented April 30, 1907.

Application filed February 5, 1907. Serial No. 355,903.

*To all whom it may concern:*

Be it known that I, THEODORE J. INGOLD, a citizen of the United States, residing at Farmington, in the county of Fulton and State of Illinois, have invented certain new and useful Improvements in Tank-Heaters; and I do hereby declare the following to be a full, clear, and exact description of the invention, such as will enable others skilled in the art to which it appertains to make and use same, reference being had to the accompanying drawings, and to the letters and figures of reference marked thereon, which form a part of this specification.

This invention relates to new and useful improvements in tank heaters, and the object of the invention is to produce a simple and efficient apparatus of this nature comprising essentially a furnace having a pipe leading to the lower portion thereof and through which air may be fed, and in the provision of a hinged inclosed water pan mounted within the upper portion of the furnace and having pipe connection with a water tank to which the heat from the products of combustion is adapted to pass.

The invention consists in various other details of construction and combinations and arrangements of parts which will be hereinafter fully described and then specifically defined in the appended claims.

I illustrate my invention in the accompanying drawings, in which:—

Figure 1 is a side elevation of my invention, parts being shown in section. Fig. 2 is a vertical sectional view, and Fig. 3 is a sectional view taken on line 3—3 of Fig. 2.

Reference now being had to the details of the drawings by letter, A designates a firebox or furnace and B, a tank adapted to contain water to be heated.

C designates a pipe leading from the upper portion of the firebox or furnace and extends nearly the length of the water tank, whereby as much of the heat as possible from the pipe may be utilized for heating the water.

D designates an air supply pipe which communicates with the firebox near the lower end thereof, preferably below the grate, and extends vertically and has its inlet end flaring, as shown at D', thereby allowing for a sufficient draft.

E designates a pan adapted to contain water and is closed and hinged at E' to the wall of the firebox or furnace.

F designates a pipe which leads from the top of said pan and is adapted to communicate with the interior of the water tank.

G designates a water supply pipe whereby water may be conveyed to the pan E. Said pipe forms one of the pivots on which the pan is mounted, as will be noted upon reference to the sectional view, Fig. 3 of the drawings.

By having the pan pivotally connected upon the trunnions, access may be had to the upper portion of the firebox, and by packing the joints properly, any leaking may be avoided. It will be noted that the rear end $E^2$ of the pan E is inclined, and a lug $E^3$ projects from the vertical rear wall of the firebox and is adapted to serve as a stop to limit the throw of the pan in one direction and holds the latter in a horizontal position.

In operation, the tank being filled with cold water and a fire started in the heater, the heat as it passes through the pipe C, will cause the wall thereof to be heated, and the heat by radiation transmitted to the water surrounding the pipe. The water within the heating pan being heated sufficiently to generate steam, the latter will pass through the pipe F and to the water tank where it is condensed and further assists in heating the water in the tank.

From the foregoing, it will be noted that by the provision of the apparatus shown and described, a simple and efficient means is afforded whereby water of a stock tank may be readily heated, utilizing a large proportion of heat which otherwise would waste.

What I claim is:—

1. A tank heater comprising a firebox and a tank, a pipe leading through the adjacent walls of the firebox and tank through which the products of combustion are adapted to pass, a pan mounted at one side of its center upon trunnions within the firebox, one of said trunnions being hollow and through which water may be fed to the pan, the top of said pan having a hollow nipple, a pipe connected to said nipple and extending into said tank, and means for holding the pan in a horizontal position, as set forth.

2. A tank heater comprising a firebox and a tank, a pipe leading through the adjacent walls of the firebox and tank through which the products of combustion are adapted to pass, a pan mounted at one side of its center upon trunnions within the firebox, one of said trunnions being hollow and through which water may be fed to the pan, the top of said pan having a hollow nipple, a pipe connected to said nipple and extending into said tank, the back of said pan being inclined, a lug projecting from the wall of the firebox and adapted to serve as a stop against which the rear of the pan is adapted to contact to hold the latter in a horizontal position, as set forth.

In testimony whereof I hereunto affix my signature in the presence of two witnesses.

THEODORE J. INGOLD.

Witnesses:
　THEO. BASS,
　CLYDE STEENBERG.